United States Patent
Ito et al.

[11] Patent Number: 6,128,184
[45] Date of Patent: Oct. 3, 2000

[54] ELECTRONIC DEVICE AND ELECTRONIC DEVICE BATTERY

[75] Inventors: Susumu Ito; Makoto Tanahashi, both of Kanagawa; Teiyu Goto, Saitama; Tsutomu Asawa, Nagano, all of Japan

[73] Assignee: Sony Corporation, Tokyo, Japan

[21] Appl. No.: 09/161,945

[22] Filed: Sep. 28, 1998

[30] Foreign Application Priority Data

Sep. 29, 1997 [JP] Japan ................... 9-263884

[51] Int. Cl.$^7$ .............. H05K 5/00; H05K 7/00; A47B 81/00; A47B 97/00

[52] U.S. Cl. .............. 361/681; 361/681; 361/683; 361/686; 312/223.1

[58] Field of Search ................... 361/683, 686, 361/681; 439/90; 312/223.1

[56] References Cited

U.S. PATENT DOCUMENTS

| | | | |
|---|---|---|---|
| 4,571,456 | 2/1986 | Paulsen et al. ................... 179/2 C |
| 5,107,401 | 4/1992 | Youn ................... 361/393 |
| 5,243,549 | 9/1993 | Oshiba ................... 364/708 |
| 5,293,300 | 3/1994 | Leung ................... 361/683 |
| 5,321,580 | 6/1994 | Hosoi et al. ................... 361/684 |
| 5,428,350 | 6/1995 | Kurcbart et al. ................... 340/825.44 |
| 5,506,749 | 4/1996 | Matsuda ................... 361/683 |
| 5,583,744 | 12/1996 | Oguchi et al. ................... 361/683 |
| 5,594,617 | 1/1997 | Foster et al. ................... 361/679 |
| 5,621,613 | 4/1997 | Haley et al. . | |
| 5,677,827 | 10/1997 | Yoshioka et al. ................... 361/683 |
| 5,796,578 | 9/1998 | Jones ................... 361/683 |
| 8,162,576 | 4/1997 | Tadayoshi . | |

FOREIGN PATENT DOCUMENTS

| | | |
|---|---|---|
| 0 355 203 | 2/1990 | European Pat. Off. . |
| 0 396 009 A2 | 11/1990 | European Pat. Off. . |
| 2 309 740 | 8/1997 | United Kingdom . |
| Wo 96/23399 | 8/1996 | WIPO . |

*Primary Examiner*—Leo P. Picard
*Assistant Examiner*—Tung Minh Bui
*Attorney, Agent, or Firm*—Frommer Lawrence & Haug, LLP.; William S. Frommer; Matthew K. Ryan

[57] ABSTRACT

A portable electronic means including a body and a display portion which is openably and closably mounted with respect to the body, and an electronic device battery. The portable electronic means further includes a pair of hinges (opening-and-closing portions) for openably and closably mounting the display portion to the body, with a battery being mechanically and electrically mounted between the pair of hinges so as to be removable therefrom. The electronic means makes it possible to eliminate all the factors that prevent a reduction in the thickness of the electronic device due to the use of an externally mounting type battery, and has a display portion capable of being opened and closed with respect to its body by more than 180 degrees.

34 Claims, 16 Drawing Sheets

ELECTRONIC DEVICE AND ELECTRONIC DEVICE BATTERY

BACKGROUND OF THE INVENTION

1. Field of the Invention

The present invention relates to an electronic device which eliminates all the factors that prevent a reduction in the thickness of the electronic device resulting from the use of an externally mounting type battery, and which has a display portion capable of being opened and closed with respect to its body by more than 180 degrees. The present invention also relates to a battery for this type of electronic device.

2. Description of the Related Art

In recent years, many portable electronic devices incorporating a central processing unit (CPU), such as notebook personal computers and mobile computers, have been made commercially available. In such electronic devices, the CPU is driven at a high clock frequency, so that a large amount of electrical power is consumed at the CPU, as a result of which electrical power consumption is concentrated at the CPU. Consequently, such electronic devices require a means for efficiently dissipating the heat of the CPU outside the CPU.

In general, portable electronic devices, such as notebook personal computers, comprise a body and a display portion. The display portion can be opened and closed with respect to the body through hinges.

Opening-and-closing structures, such as those shown in FIGS. 19 and 20, have conventionally been known as being used in notebook personal computers or the like in order to openably and closably support the display portion with respect to the body.

In the conventionally known opening-and-closing structure of FIG. 19, a liquid crystal display 1002 is openably and closably mounted to a body 1000 through a hinge 1001. In addition, a built-in type battery pack 1003 is accommodated in the body 1000.

On the other hand, in the conventionally known opening-and-closing structure of FIG. 20, a display 2001 is openably and closably mounted to a body 2000 through a hinge mechanism 2002. In addition, an externally mounting type battery pack 2003 is mounted to the rear end of the body 2000 in order to supply electrical power to the body 2000.

However, the structure of FIG. 19 has the following problems. Since the shaft of the hinge 1001 is disposed in the back edge 1004 of the thin, panel-shaped liquid crystal display 1002, the diameter of the hinge 1001 must be made smaller than the thickness of the liquid crystal display 1002. This prevents the hinge 1001 from having sufficient mechanical durability and strength. In addition, since the space for passing a signal wire from the body 1000 towards the liquid crystal display 1002 is small, an expensive flexible cable must be used as signal wire.

Further, in this structure, the rear end 1004 of the liquid crystal display 1002 is folded on top of the battery pack consisting of a plurality of batteries 1003A arranged in a row. Therefore, this structure is a layered type structure whose overall thickness cannot be reduced.

The structure of FIG. 20 has the following problems. Since the hinge mechanism 2002 and the battery pack 2003 are not coaxially disposed, a portion, with a thickness R1, for coupling the display 2001 and the hinge 2002 together must be provided. This means that the overall thickness of the portable personal computer is equal to the sum of thickness R1 of the coupling portion and the outside thickness R2 of the externally mounting type battery pack 2003. Consequently, the coupling portion with thickness R1 prevents the overall thickness of the portable personal computer from being reduced.

In the structure of FIG. 20, the presence of the battery pack 2003 limits the opening and closing range of the display 2001 to less than 180 degrees.

SUMMARY OF THE INVENTION

Accordingly, it is an object of the present invention to provide an electronic device which can eliminate the above-described problems to eliminate the factors that prevent the overall thickness of the electronic device from being reduced due to the presence of an externally mounting type battery, and which allows the display portion to be opened and closed with respect to the body by more than 180 degrees; and to provide an electronic device battery.

To this end, according to one aspect of the present invention, there is provided an electronic device comprising at least a pair of opening-and-closing mechanical portions for openably and closably supporting a display portion with respect to a body; and a battery, disposed between the pair of opening-and-closing mechanical portions, for supplying electrical driving power to the body.

According to the present invention, in order to openably and closably support the display portion to the body, a pair of opening-and-closing mechanical portions are provided, with a battery being disposed between these opening-and-closing mechanical portions.

Such a structure allows the electronic device to be made thinner even when a battery is externally mounted to the body of the electronic device. In addition, since each of the opening-and-closing mechanical portions can be formed to substantially the same outer diameter as the battery, the opening-and-closing mechanical portions can be made mechanically more durable and strong.

Further, such a structure allows the display portion to be opened by more than 180 degrees with respect to the body, since the battery in no way interferes with the opening and closing operations of the display portion. Still further, even if, by mistake, the user opens the display portion by more than 180 degrees, breakage of the body, the display portion, or the battery does not occur.

Although not exclusive, the pair of opening-and-closing mechanical portions may comprise a first opening-and-closing mechanical portion, disposed between one side end of the body and one side end of the display portion, for openably and closably supporting the display portion with respect to the body; and a second opening-and-closing mechanical portion, disposed between the other side end of the body and the other side end of the display portion, for openably and closably supporting the display portion with respect to the body; wherein the battery is disposed between the first opening-and-closing mechanical portion and the second opening-and-closing mechanical portion.

Such a structure allows the electronic device to be made thinner even when a battery is externally mounted. Disposing the first opening-and-closing mechanical portion and the second opening-and-closing mechanical portion at both ends of the battery allows the first opening-and-closing mechanical portion and the second opening-and-closing mechanical portion to have about the same outside dimensions as the battery, and thus to have sufficient mechanical durability and strength.

In addition, since the first opening-and-closing mechanical portion and the second opening-and-closing mechanical portion are disposed between the ends of the body and the display portion, the opening-and-closing mechanical portions can be increased in size, and sufficient space can be obtained for providing a signal wire from a circuit portion of the body to the display portion, allowing the use of a cheap ordinary wire and designing with greater freedom.

Although not exclusive, the pair of opening-and-closing mechanical portions may both comprise cylindrical hinge mechanisms; and the battery may be cylindrical in shape which has substantially the same diameter as the hinge mechanisms, with the centers of rotation of the hinge mechanisms being disposed on a line extended from the axial line of the battery.

This allows the electronic device to be made thinner even when a battery is externally mounted, and to have a good appearance, and the outer dimensions of the battery and the hinges can be made equal to the overall thickness of the electronic device. Accordingly, the entire electronic device can be made thin, and the battery and the hinges can be made large, thereby satisfying two opposing design specification demands.

Although not exclusive, either one or both of the opening-and-closing mechanical portions may comprise hinge mechanisms constructed to conduct heat such that the heat that is generated in a body case is made to travel towards a display portion case, through the hinge mechanism or the hinge mechanisms.

This allows heat, generated at the body, to be dissipated by a larger amount, even when the electronic device is made thinner.

Although not exclusive, the electronic device may further comprise a guiding mechanical portion for guiding the battery in a direction of insertion and removal of the battery, when the battery is being mounted to and removed from the body.

This facilitates sliding of the battery when it is being mounted to or removed from the body.

Although not exclusive, the electronic device may further comprise a connecting mechanical portion for removably mounting the battery to the body, and for mechanically and electrically connecting the battery to the body; and a guiding mechanical portion for guiding the battery in a direction of insertion and removal of the battery, when the battery is being mounted to and removed from the body.

This prevents damage to the electrically connecting terminal, etc., of the connecting mechanical portion caused by undue stress exerted thereupon during mounting and removal to and from the body.

Although not exclusive, the guiding mechanical portion may comprise a first guiding mechanical portion which is disposed between one end of the battery and the first opening-and-closing mechanical portion, and a second guiding mechanical portion which is disposed between the other end of the battery and the second opening-and-closing mechanical portion.

This prevents damage to the electrically connecting terminal, etc., caused by stress exerted thereupon during mounting of the battery, using a simple structure.

Although not exclusive, the electronic device may further comprise a securing mechanical portion for securing the battery being mounted to the body.

This allows the battery to be reliably positioned at and secured to the body.

Although not exclusive, the securing mechanical portion and the connecting mechanical portion for removably mounting the battery may be disposed in a row at the contact surfaces of the body and the battery.

This allows the battery to be secured to the body by the securing mechanical portion, and, at the same time, the battery to be electrically connected to the body by the connecting mechanical portion, by simply bringing the contact surfaces of the body and the battery into contact with each other.

According to another aspect of the present invention, there is provided an electronic device comprising at least a pair of opening-and-closing mechanical portions for openably and closably supporting a display portion with respect to a body; and a body side connecting mechanical portion, disposed between the pair of opening-and-closing mechanical portions, for removably mounting a battery supplying electrical driving power to the body.

Such a structure allows the external form of the battery to be designed with sufficient freedom. In other words, the battery can take various forms and have various dimensions on the physical condition that it fits between the pair of opening-and-closing mechanical portions. Therefore, the external form of the battery is not limited by the form of the body, thereby allowing the external form of the battery itself to be designed freely.

According to still another aspect of the present invention, there is provided an electronic device battery mounted to a body side connecting mechanical portion that is disposed between at least a pair of opening-and-closing mechanical portions that openably and closably support a display portion with respect to a body, the electronic device battery comprising a battery side connecting mechanical portion which is removably fitted to the body side connecting mechanical portion.

The external form of the electronic device battery is not limited by the external form of the body, thereby allowing the battery to be freely designed into, for example, a cylindrical shape. This eliminates the need for protrusions, making the electronic device battery easier to carry, and allowing it to be formed into an excellent form from the viewpoint of designing.

DESCRIPTION OF THE PREFERRED EMBODIMENT

A description will now be given of a preferred embodiment of the present invention with reference to the appended drawings.

Since the embodiment to be described below is a preferred embodiment of the present invention, various specific technological forms are described below. However, unless otherwise specified, these technological forms in no way limit the scope of the present invention.

Figure 1:
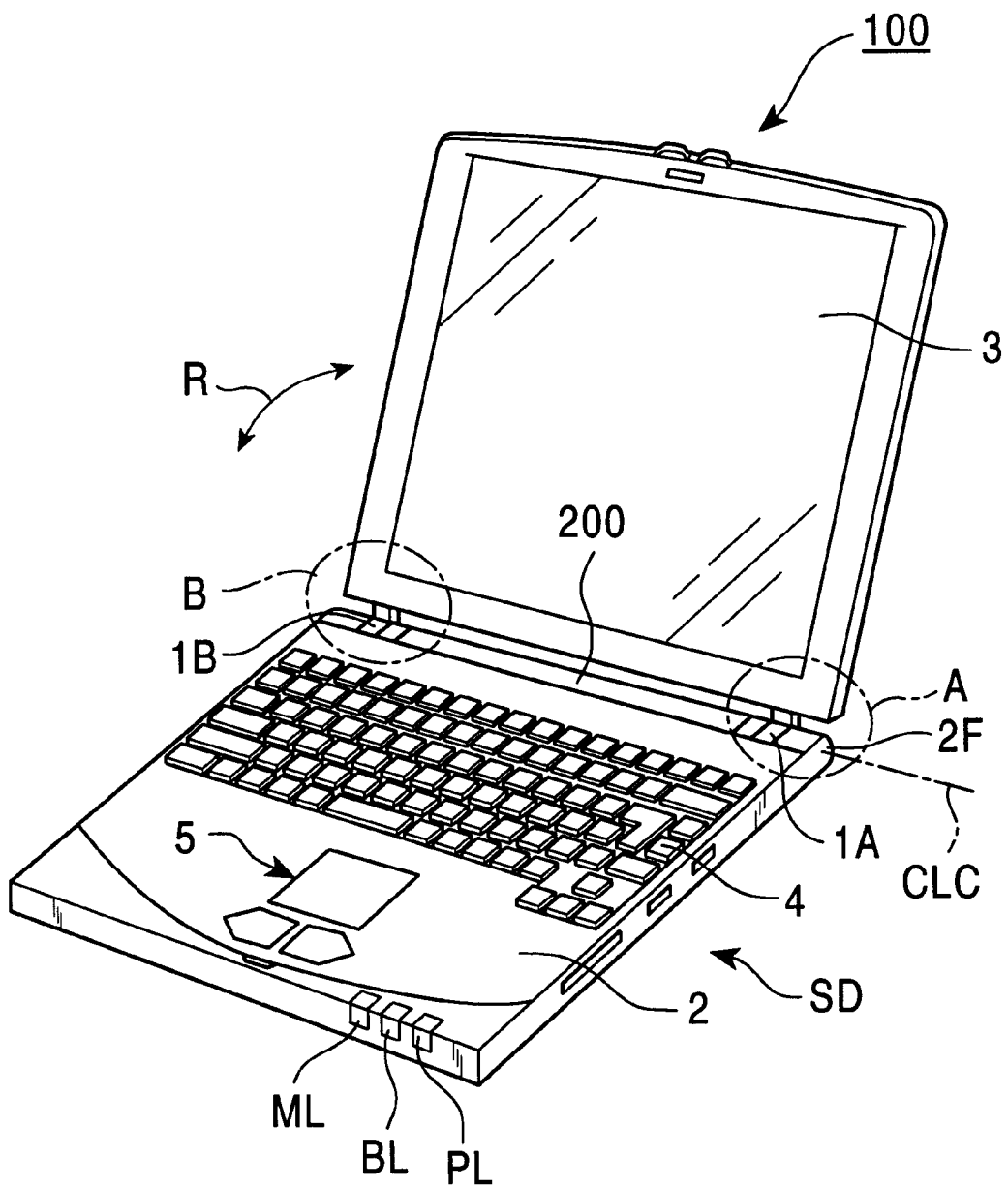
FIG. 1 is a perspective view of an embodiment of the electronic device in accordance with the present invention.

FIG. 1 illustrates an electronic device in accordance with the present invention. The electronic device of FIG. 1 is a portable computer 100. The portable computer 100 includes a body 2, a display portion 3, a keyboard 4, hinges 1A and 1B within areas A and B, and a battery pack 200, etc.

The body 2 has the aforementioned keyboard 4 and a pointing device 5 or the like, and the display portion 3 may be, for example, a liquid crystal display (LCD) portion. The hinges 1A and 1B (first opening-and-closing portion and second opening-and-closing portion) are mounted to the body 2 so as to allow opening and closing operations in the directions of a double-headed arrow R. Although not illustrated in FIG. 1, a device, such as a mouse being an externally mounting type pointing means, may be set with respect to the body 2 from outside the electronic device. The body has a power supply lamp PL, a battery lamp BL, and a message lamp ML, with the battery lamp BL indicating the amount of power left in the battery pack 200.

Figure 2:
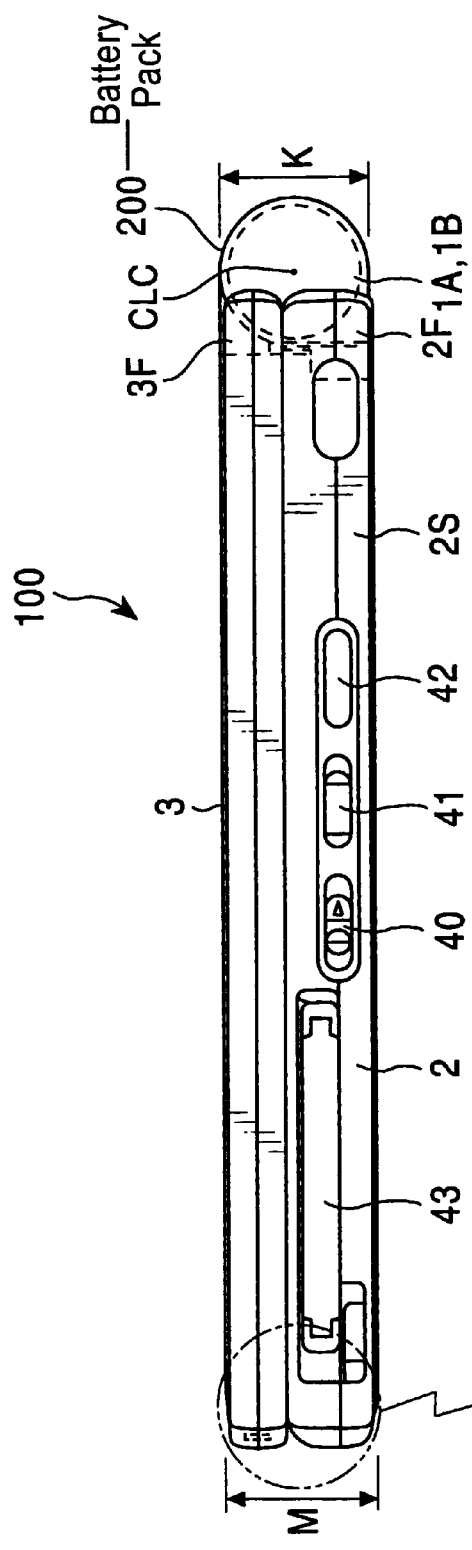
FIG. 2 is a side view of a computer serving as the electronic device of FIG. 1.
Figure 2A:
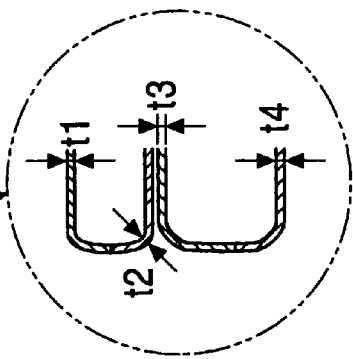

FIG. 2 illustrates the display portion 3 of the electronic device of FIG. 1 being folded onto the body 2, with a center axis CLC as center, as viewed in a direction of arrow SD. In FIG. 2, at a side face 2S of the body 2 are disposed a power supply switch 40, and other switches 41 and 42. In addition, at the side face 2S is disposed a slot 43 for inserting therein an electronic card (PC card).

In FIG. 2, the thickness of one end portion of the body 2 and the thickness of one end portion of the display portion 3 are represented by t1 to t4, which are set at very small values. For example, thickness t1 is set at 1.2 mm, thickness t2 at 1.0 mm, thickness t3 at 1.0 mm, and thickness t4 at 1.2 mm.

Figure 3:
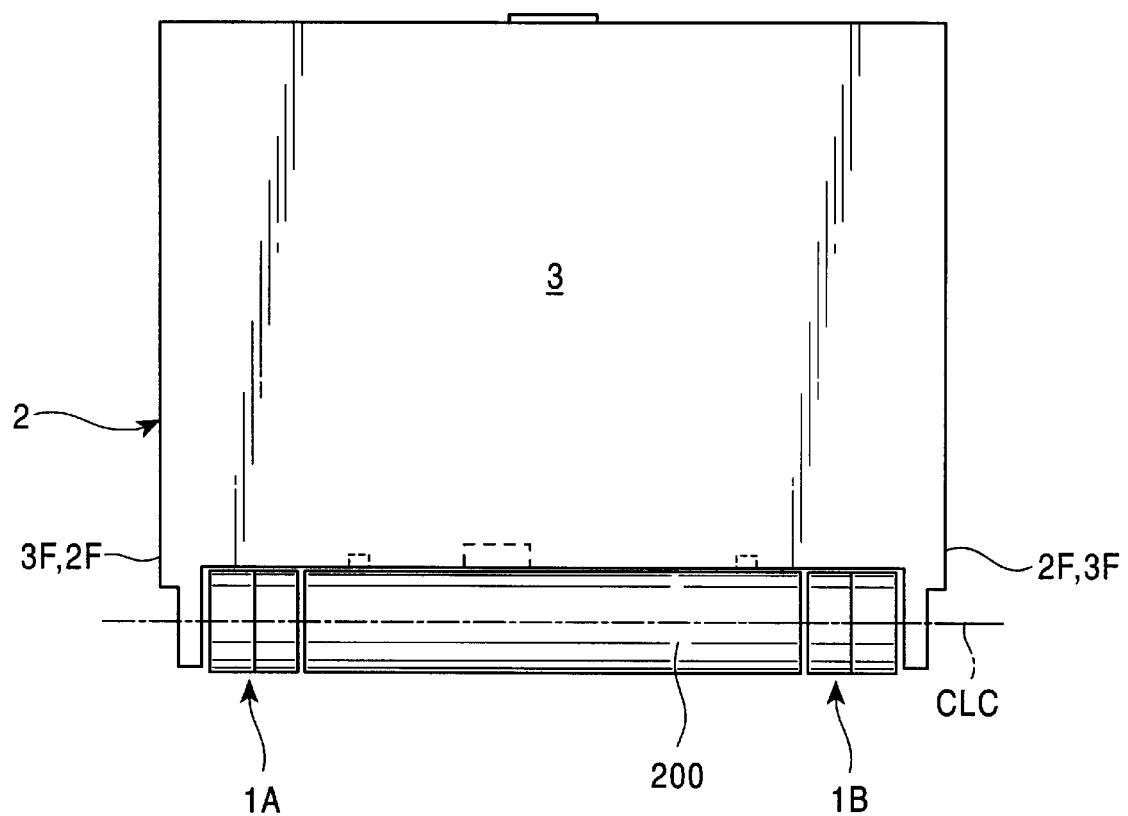
FIG. 3 is a plan view of a display portion being in a closed state with respect to the body of the electronic device in accordance with the present invention.

A feature in FIGS. 1 to 3 is that the battery pack 200 is disposed between the hinges 1A and 1B. Center axis CLC, which corresponds to the rotational center of the hinges 1A and 1B, lies on the extension line of the axis of the battery pack 200. In other words, the center axis of the battery pack 200 and the center axis of the hinges 1A and 1B are not disposed coaxially. The battery pack 200 is removably mounted to the body 2 and is electrically connected when it is mounted.

As shown in FIGS. 2 and 3, the battery pack 200 is located in the vicinity of rear end 2F of the body 2 and rear end 3F of the display portion 3. The battery pack 200 and the hinges 1A and 1B have substantially the same diameters, and diameter K thereof is about the same as thickness M equal to the sum of the display portion 3 and the body 2 when the display portion 3 is folded upon the body 2. This causes the capacity of the battery pack 200 to become large while making the thickness M of the portable computer 100 as small as possible, and the diameter K of the hinges 1A and 1B can be made as large as possible. As a result, the hinges 1A and 1B have sufficient durability and strength.

Figure 4:
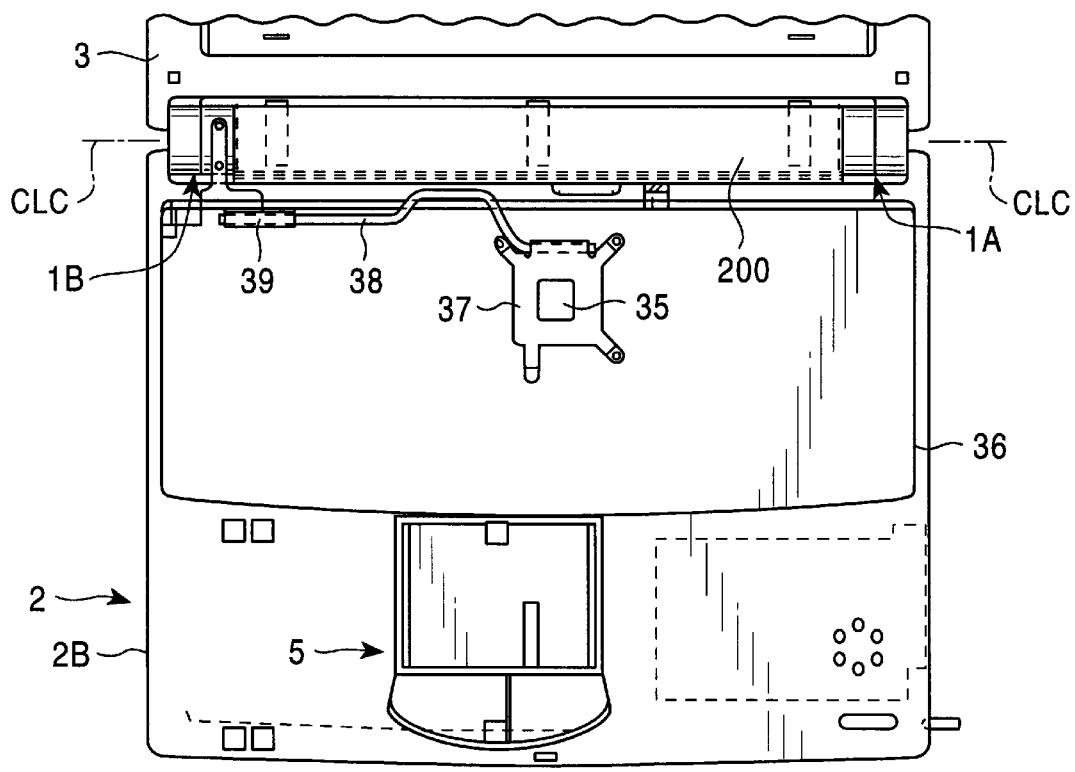
FIG. 4 is a plan view of the body and a battery pack.
Figure 5:
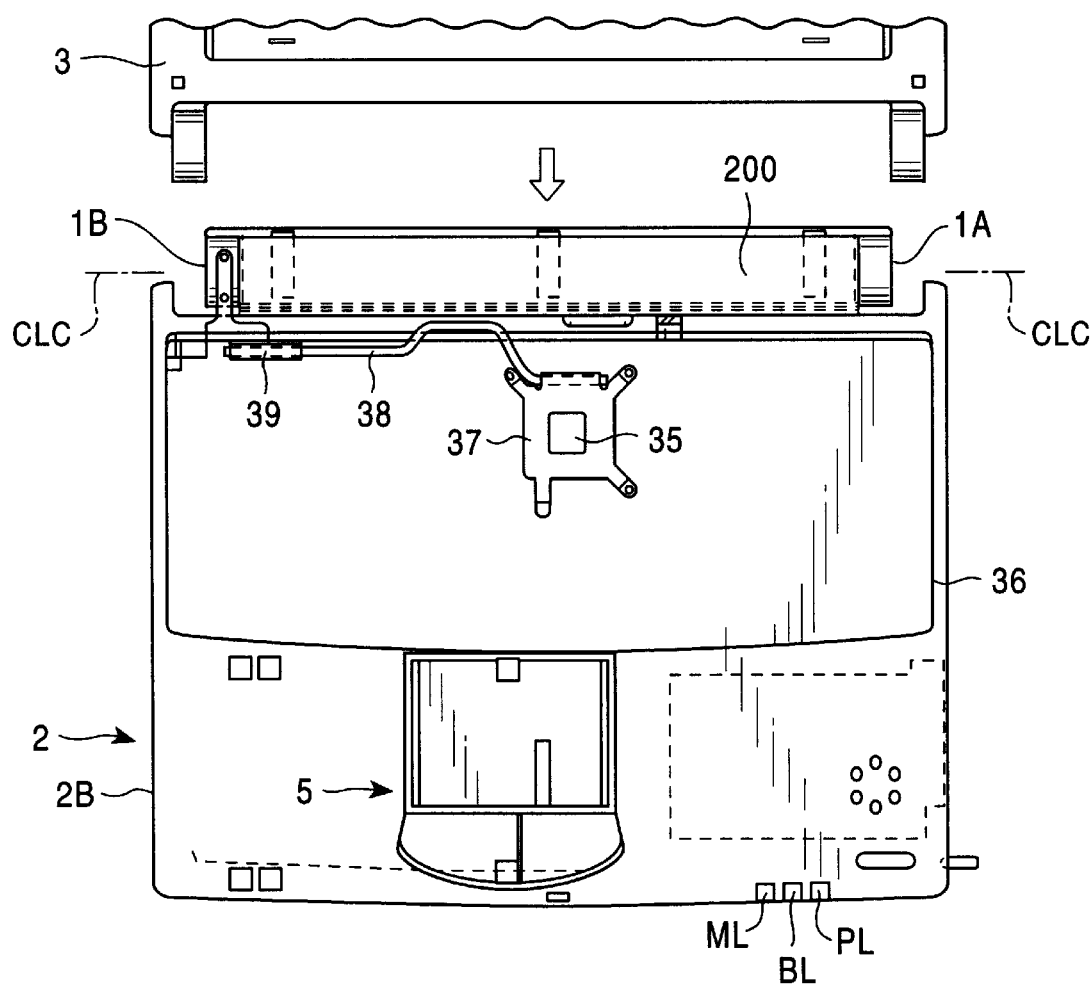
FIG. 5 illustrates the body and the battery pack, with the display portion being in a removed state.
Figure 6:
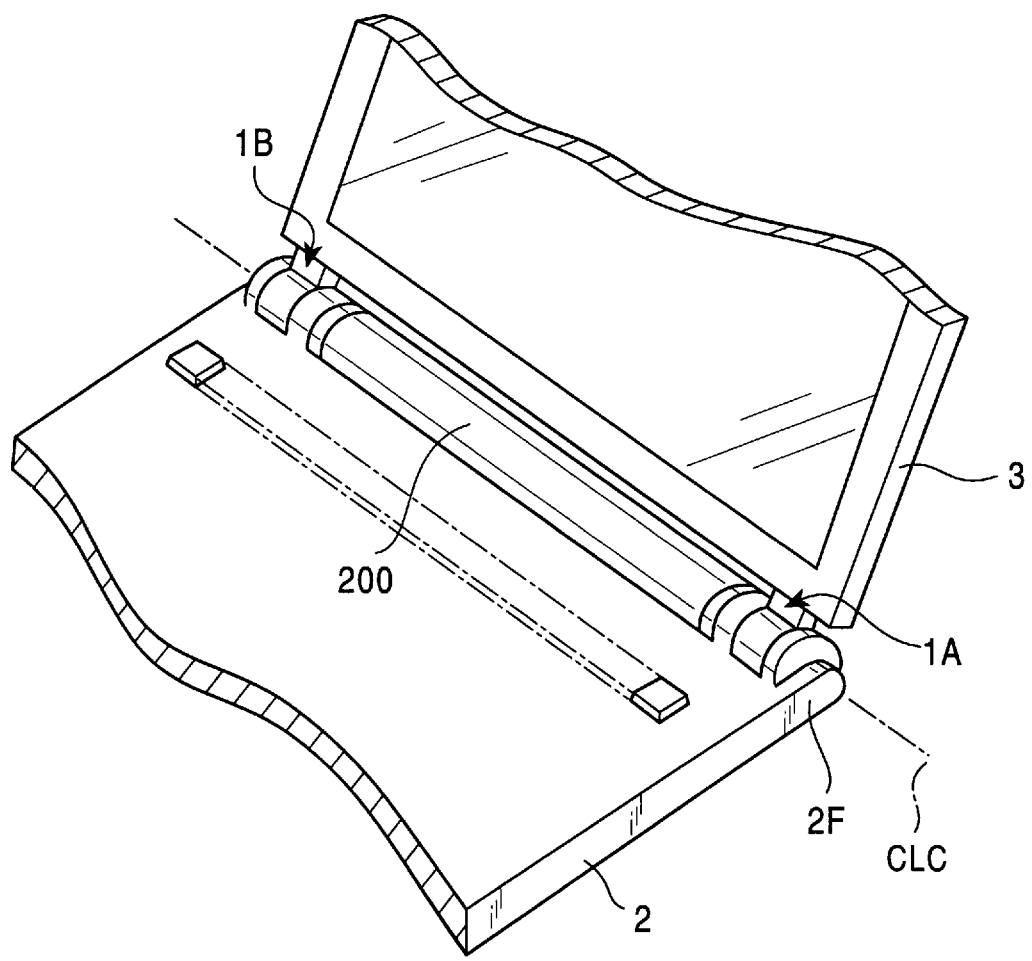
FIG. 6 is a perspective view of part of the structure consisting of the body, the display portion, and the battery pack.

As shown in FIGS. 4, 5, and 6, the battery pack 200 is disposed at the back end 2F of the body 2 and between the hinges 1A and 1B. The battery pack 200 has the shape shown in FIGS. 7 to 13. For example, secondary batteries, such as lithium ion secondary batteries, may be used for the battery pack with a case 201. The case 201 is formed, for example, by plastic molding, and has one or more battery cells contained therein. The case 201 has mechanical mounting portions 202, grooves 203, and an electrical connecting terminal 204.

Figure 8:
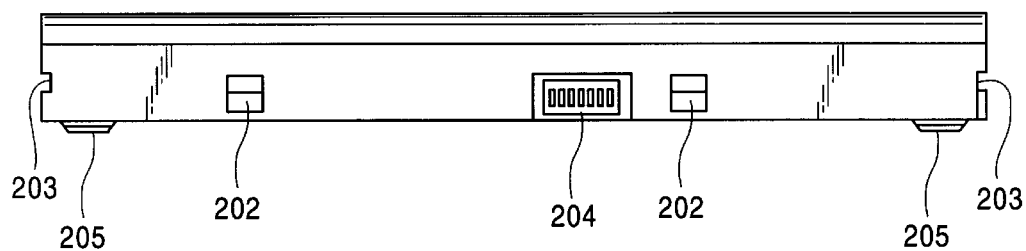
FIG. 8 is a front view of the battery pack.
Figure 9:
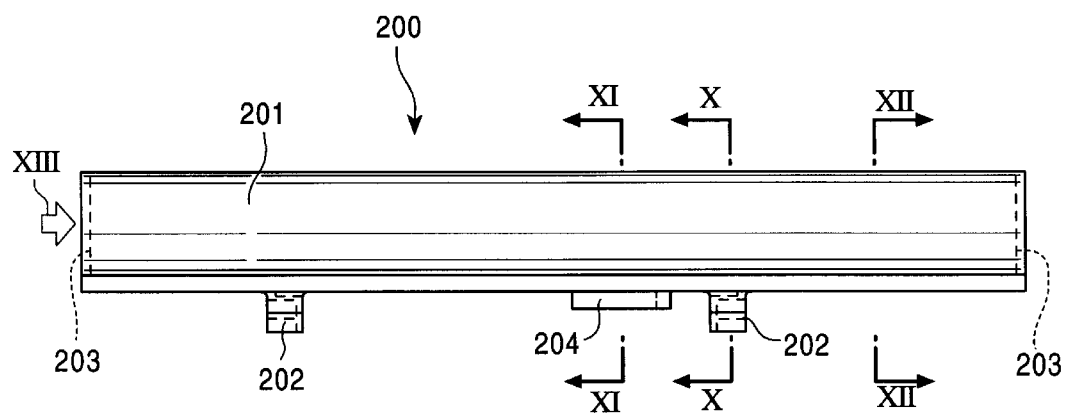
FIG. 9 is a plan view of the battery pack.
Figure 10:
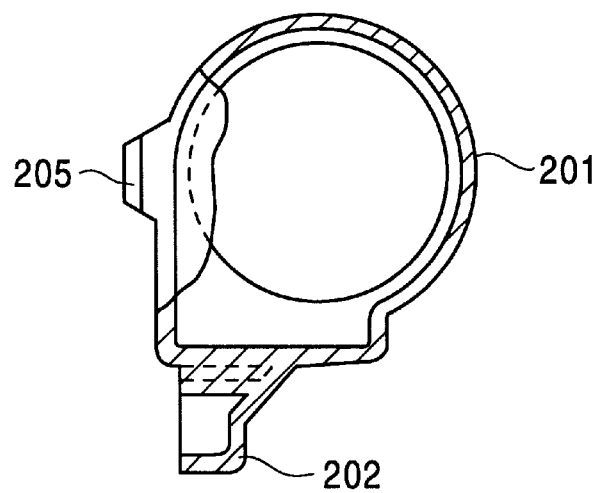
FIG. 10 is a sectional view taken along line X—X of FIG. 9.
Figure 11:
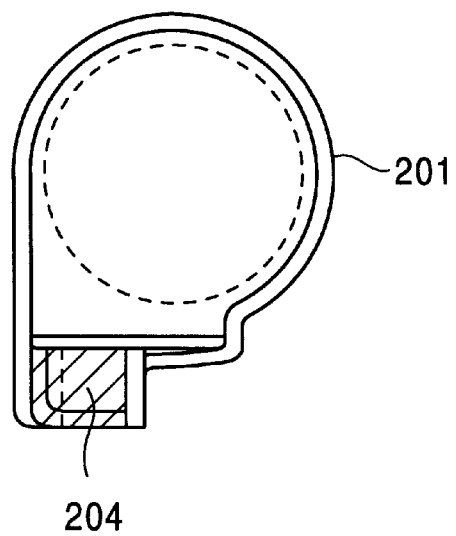
FIG. 11 is a sectional view taken along line XI—XI of FIG. 9.
Figure 12:
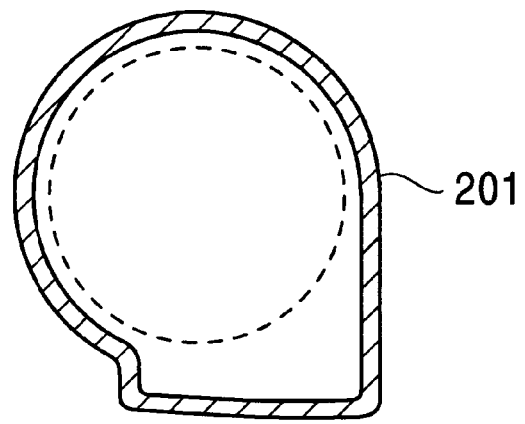
FIG. 12 is a sectional view taken along line XII—XII of FIG. 9.
Figure 13:
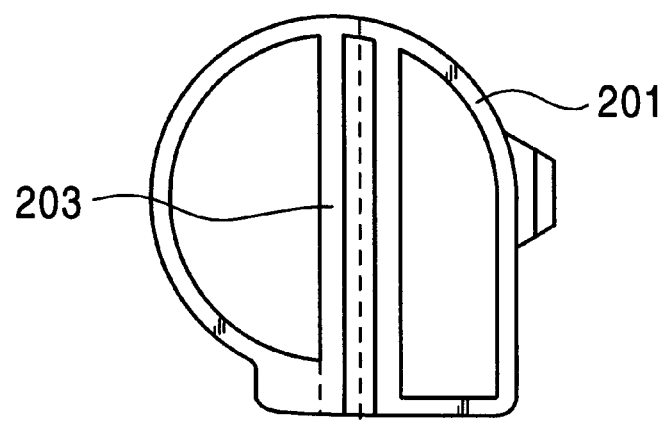
FIG. 13 is a side view of the battery pack as view from direction XIII of FIG. 9.

As shown in FIGS. 8 and 10, the case 201 has two ground portions 205 that support the battery pack 200 so that the battery pack 200 does not slide along the supporting surface of, for example, a desk. These ground portions 205 are made of, for example, rubber.

Figure 7:
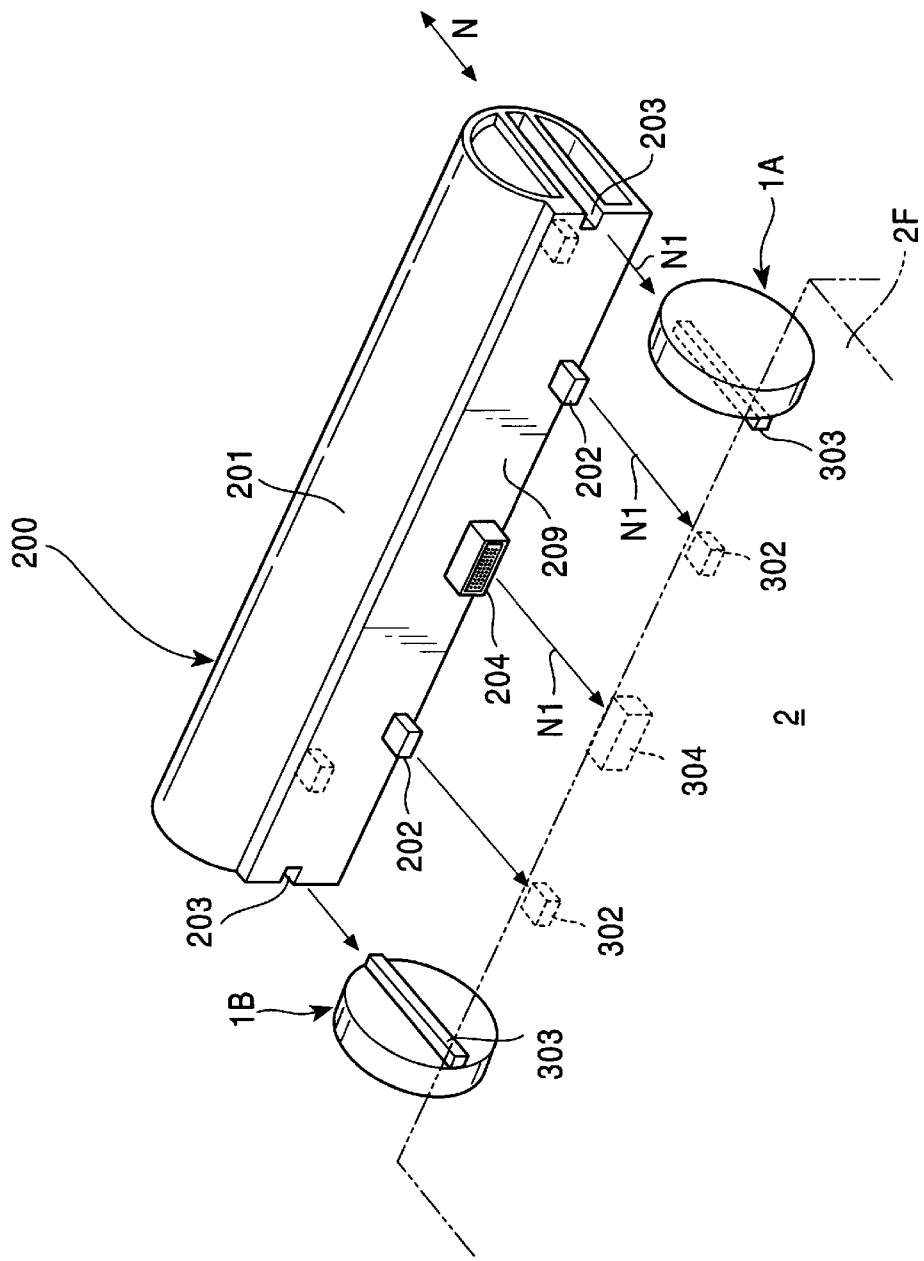
FIG. 7 is a perspective view showing the relationship between the connecting parts of the battery back and those of the body.

The grooves 203 are formed in the left end and the right end of the case 201 in a horizontal direction N in FIG. 7. The mounting portions 202 protrude from a contact surface of the case 201. Between the mounting portions 202 and 202 and at the contact surface 209 is disposed the male electrical connecting terminal 204.

Recesses 302 are formed in the back end 2F of the body 2 in correspondence with the mounting portions 202. The body 2 has an electrical connecting terminal 304 for electrically inserting therein the electrical connecting terminal 204.

Guide projections 303 are provided at the body side of the hinges 1A and 1B. By inserting the projections 303 into the grooves 203 at both ends of the battery pack 200, the battery pack 200 can be guided along the direction of the double-headed arrow N1 and fitted to the hinges 1A and 1B. The grooves 203 and the protrusions 303 form an engaging portion or a guide mechanical portion. The mounting portions 202 of the battery pack 200 are fitted into their corresponding recesses 302 in the body 2. Accordingly, the battery pack 200 is reliably electrically and mechanically mounted to the body 2 so as to be removable therefrom. Accordingly, with the battery pack 200 mounted to the body 2, electrical driving power is supplied from the battery pack 200 to the body 2 through the electrically connecting terminal 204.

In other words, the mounting portions 202 are mechanically fitted into their respective recesses 302 in the body 2, and the electrically connecting terminal 204 is electrically connected to an electrically connecting terminal 304 of the body 2.

In addition, the grooves 203 and the protrusions 303 allow the battery pack 200 to be guided. Therefore, it is possible to prevent breakage of the electrically connecting terminals 204 and 304 caused by stress produced when the electrically connecting terminal 204 of the battery pack 200 is being mounted to or removed from the electrically connecting terminal 304.

In the aforementioned guiding mechanical portion, the grooves 203 are formed in both ends of the battery pack 200, while the protrusions 303, which are guided and slid along their respective grooves 203, are formed in the surfaces of the hinges (opening-and-closing mechanical portions) 1A and 1B which oppose both ends of the battery pack 200. Obviously, however, the grooves 203 may be formed in the surfaces of the hinges (opening-and-closing mechanical portions) 1A and 1B which oppose both ends of the battery pack, and the protrusions 303, which are guided and slide along their respective grooves 203, may be formed on both ends of the battery pack 200.

In such a configuration described above, the battery pack 200 is disposed between the hinges 1A and 1B (the pair of opening-and-closing mechanical portions), thereby allowing the display portion to open with respect to the body 2 through an angle of more than 180 degrees. In other words, since the battery pack 200 does not at all interfere with the opening and closing of the display portion 3, the display portion 3 can be opened with respect to the body 2 through an angle of more than 180 degrees. For example, even if a user sits on a chair, with his or her legs crossed, and performs key input operations after placing the body 2 on his or her knees, the user can open the display portion 3 by more than 180 degrees. Therefore, the display surface of the display portion 3 can always be maintained at right angles from the direction of line of sight, allowing the user, who is seated in a desired posture and has a good field of view, to concentrate on key input operations. In addition, even if the user inadvertently opens the display portion 3 by more than 180 degrees, breakage of the portion connecting the body 2 and the display portion 3 or breakage of the battery pack 200 does not occur.

Figure 16:
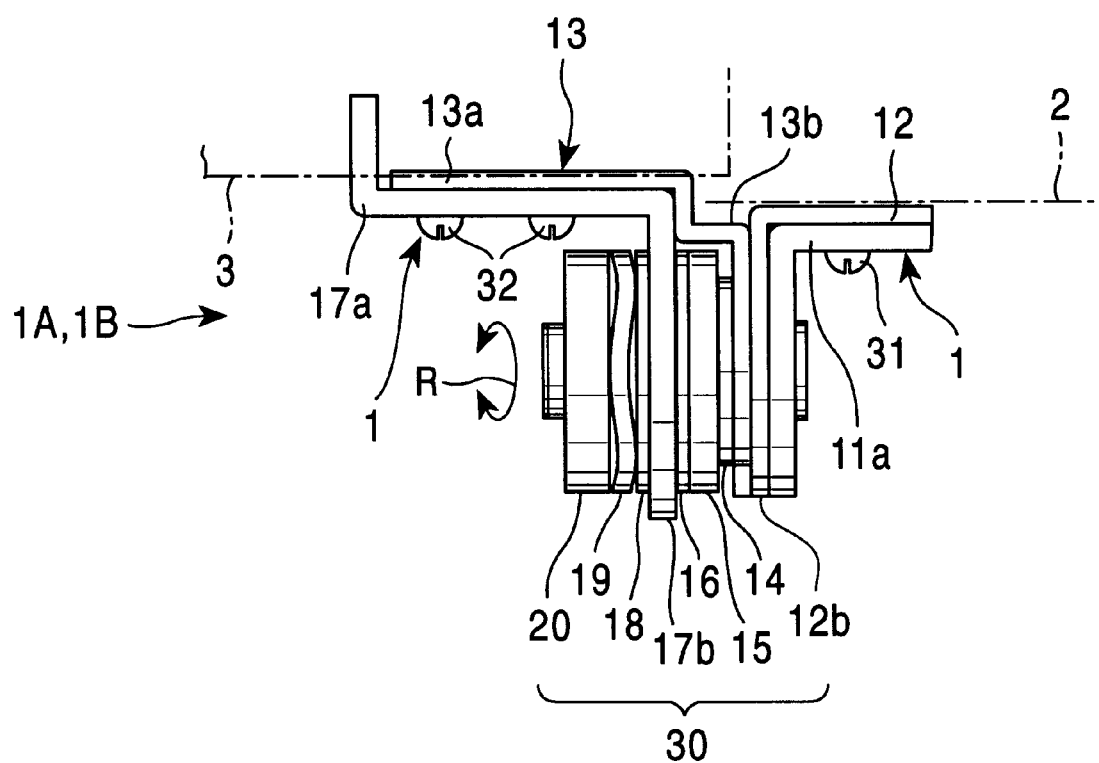
FIG. 16 is a side view of the hinge.

FIGS. 4, 5, and 16 illustrate a central processing unit (CPU) 35, serving as heat-generating source in the electronic device of the present invention, a case 2B of the body 2, the hinge 1B, and the case 3A of the display portion 3. FIG. 4 illustrates an example of a process in which heat, generated as a result of driving the central processing unit 35 serving as a heat-generating source, is either radiated or dissipated from a base 36, having mounted thereto the central processing unit 35, towards the case 3A of the display portion 3, through the hinge 1B or the like.

Figure 14:
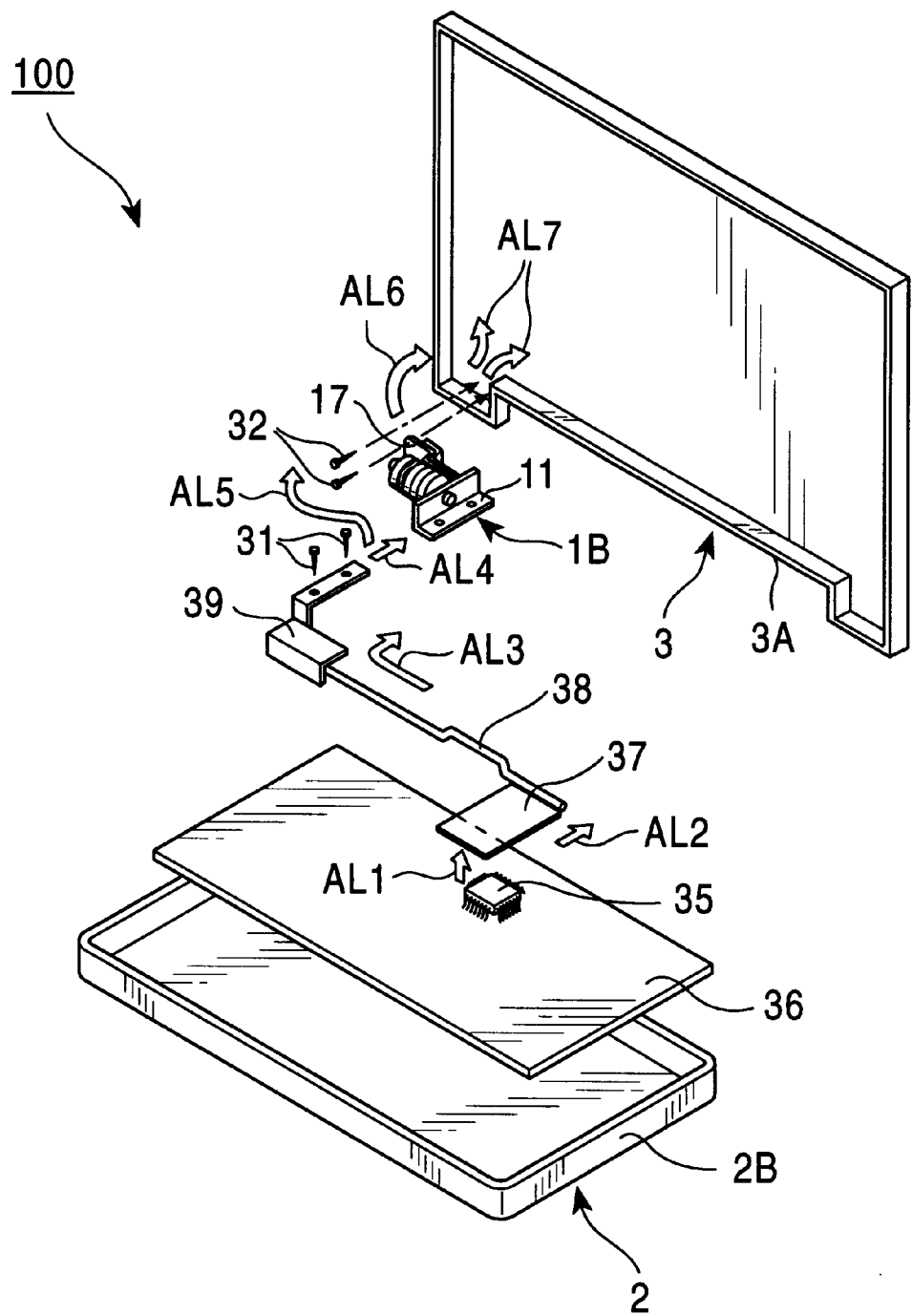
FIG. 14 is a perspective view of the body case, the display portion case, and hinges for heat conduction and for mechanical joining, shown in FIG. 1.

More specifically, the base 36 is disposed in the case 28 of FIG. 14, with the central processing unit 35 mounted on the base 36. The case 3A and the case 28 are mechanically joined together by the hinges 1A and 1B (the hinge 1A is not shown) so as to allow opening and closing operations, and are designed to allow conduction of heat of the central processing unit 35 from the base 36 towards the case 3A.

In FIGS. 4 and 5, the central processing unit 35 is disposed at virtually the center of the base 36, so that the central processing unit 35 is separated from the hinge 1B. At the central processing unit 35 side, a heat-receiving plate 37 for receiving the heat from the central processing unit 35, a heat pipe 38, and a connector 39 are disposed between the hinge 1B and the central processing unit 35. The heat-receiving plate 37 is disposed above the central processing unit 35, at a predetermined distance therefrom. The heat-receiving plate 37 and the connector 39 are connected by the heat pipe 38. The heat pipe 38 and the heat-receiving plate 37 are made of metal which conducts heat well, such as copper. The heat-receiving plate 37 is larger than the central processing unit 35.

The connector 39 is also made of a metal which conducts heat well, such as copper, and can be secured to the case 2B side of the body 2 by screwing screws 31 into a fixed portion 11 of the hinge 1B.

A movable portion 17 of the hinge 1B is secured to the inside of the case 3A using screws 32.

As will be described below, the hinge 1B is capable of efficiently conducting heat from the fixed portion 11 side towards the movable portion 17.

A description will now be given of how heat, generated at the central processing unit 35, is transferred towards the case 3A, with reference to FIG. 14.

Heat, generated by the central processing unit 35 as a result of driving it, is transferred in the direction of arrow AL1 and received by the heat-receiving plate 37. The heat, received by the heat-receiving plate 37, is transferred towards the fixed portion 11 of the hinge 1B, through the heat pipe 38 and the connector 39, as indicated by arrows AL2, AL3, and AL4.

From the fixed portion 11 side of the hinge 1B, the heat is transferred towards the movable portion 17, in the direction of arrow AL6. From the movable portion 17, the heat, which is transferred in the direction of arrow AL7, is radiated or dissipated at the case 3A.

Accordingly, transferring the heat from the body 2 side where there is a relatively large amount of heat towards the display portion 3 where there is a relatively small amount of heat prevents heat leakage in the body of the computer 100 serving as electronic device 1, so that heat is easily dissipated towards the display portion 3. Therefore, heat dissipation can be easily achieved using only hinges, thereby eliminating the need for special devices such as a heat sink or a conducting fan.

Although in FIG. 14 only the hinge 1B is used for heat conduction, it is obvious that both of the hinges 1A and 1B may be used for heat conduction.

It is to be noted that the case 2B of the body 2 is also called a bottom cabinet, the base 36 is also called a main base, and the case 3A of the display portion 3 is also called an outside cabinet.

A description will now be given of a specific structure of the hinges 1A and 1B, with reference to FIGS. 15 to 17.

The hinges 1A and 1B of FIG. 1 mechanically join the display portion 3 to the back end 6 of the body 2, and are designed to conduct or dissipate heat.

The hinges 1A and 1B, which are symmetrically formed on the left and right sides, have essentially the same structure. Therefore, only the structure and features of the hinge 1A are described, with reference to FIGS. 15 to 17.

Figure 15:
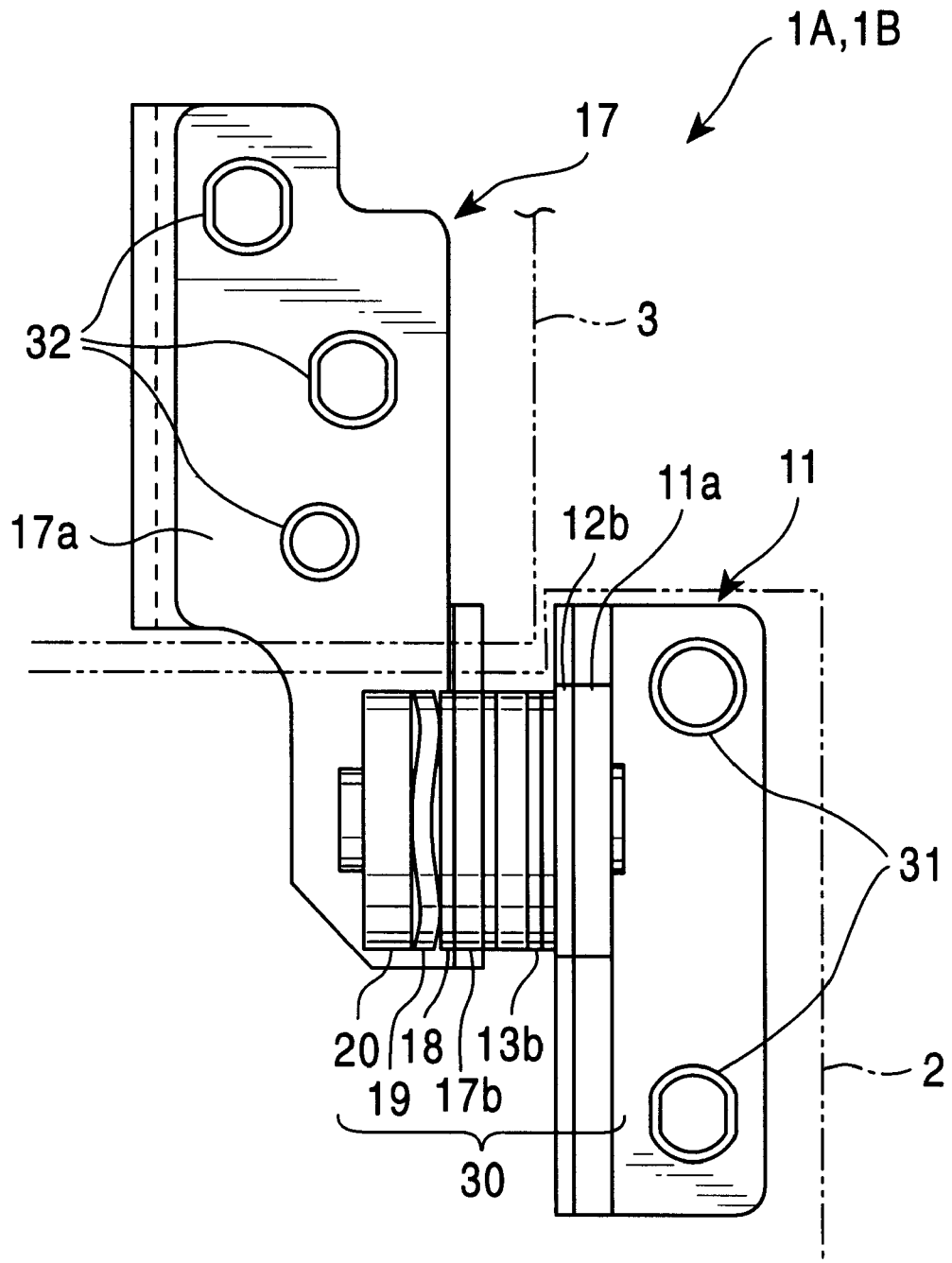
FIG. 15 is a plan view of an example of a hinge.

As shown in FIGS. 15 and 16, the hinge 1A has fixed portion 11, movable portion 17, and a coupling portion 30. The coupling portion of FIG. 17 is used for coupling the fixed portion 11 and the movable portion 17 in a mechanical fashion so as to make possible heat conduction.

The fixed portion 11 is composed of a strength retaining portion 11a for retaining mechanical strength, and a heat-conducting portion 12 for conducting heat. It is preferable that the strength retaining portion 11a be made of a material having high mechanical strength, such as stainless steel (SUS) being an iron type material, in order to retain the strength of the strength-retaining portion 11a and to keep the display portion 3 of FIG. 1 in an openable and closable state when the display portion 3 of FIG. 1 is being opened and closed. The strength retaining portion 11a, which is composed of a plate-shaped material with high mechanical strength, is formed into a substantially L shape in cross section.

The heat-conducting portion 12 is preferably made of a material which is suitable for heat conduction, such as a copper type or an aluminum type material. It is formed into the shape of a plate, and is substantially L-shaped in cross section in order to bring it into close contact with and to secure it to or set it at the strength retaining portion 11a.

The strength retaining portion 11a of the fixed portion 11 and the heat-conducting portion 12 are brought into close contact for use, with the fixed portion 11 being secured to the body 2 mounting surface side (or the side contacting the body) using, for example, screws 31.

Figure 17:
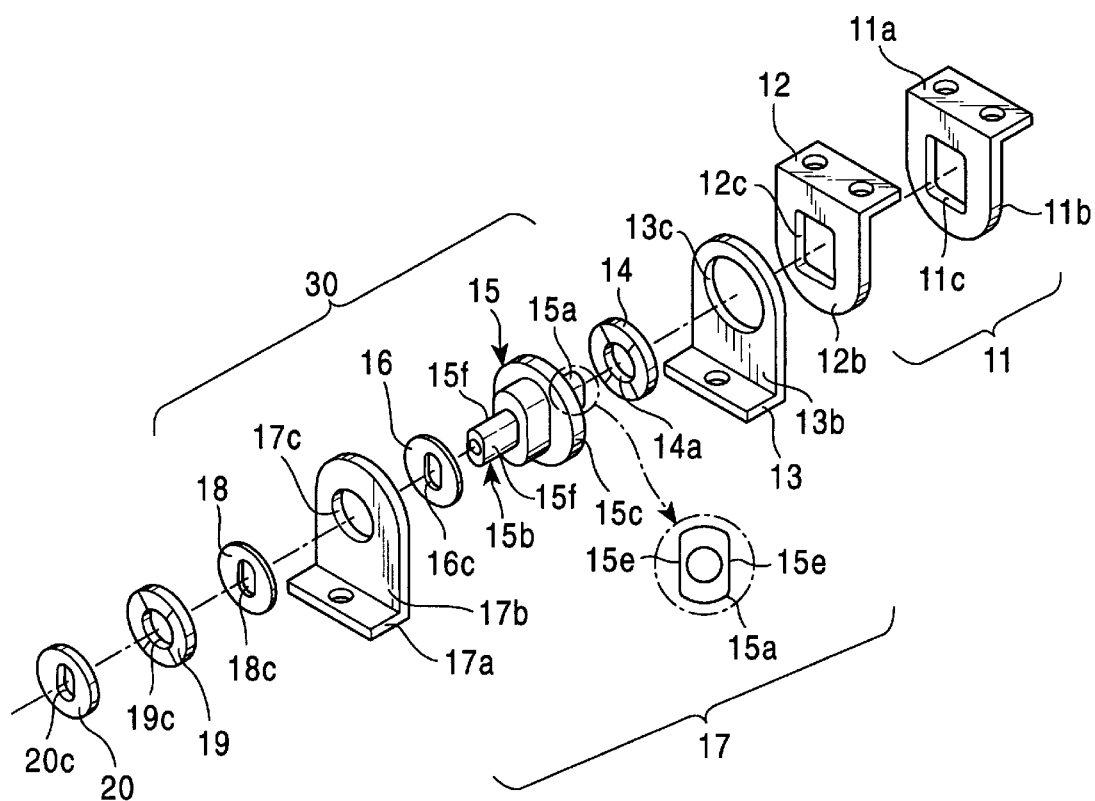
FIG. 17 is an exploded perspective view of the hinge structure.
Figure 18:
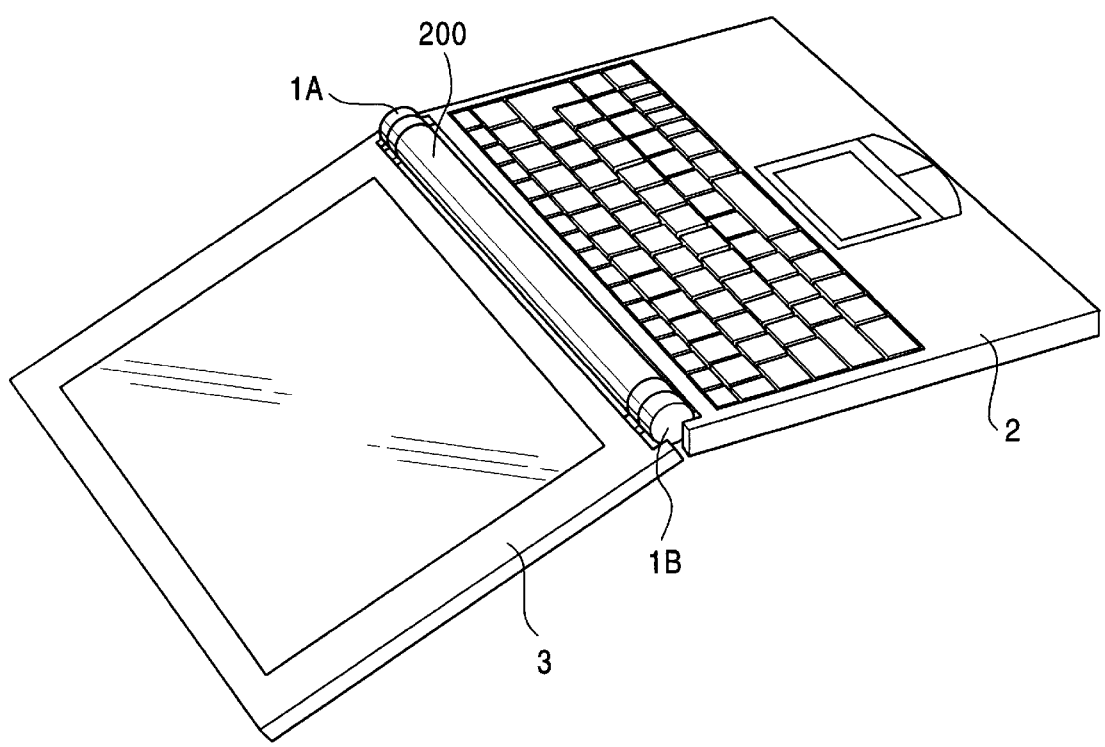
FIG. 18 is a perspective view of an electronic device in accordance with the present invention in one condition of use.
Figure 19:
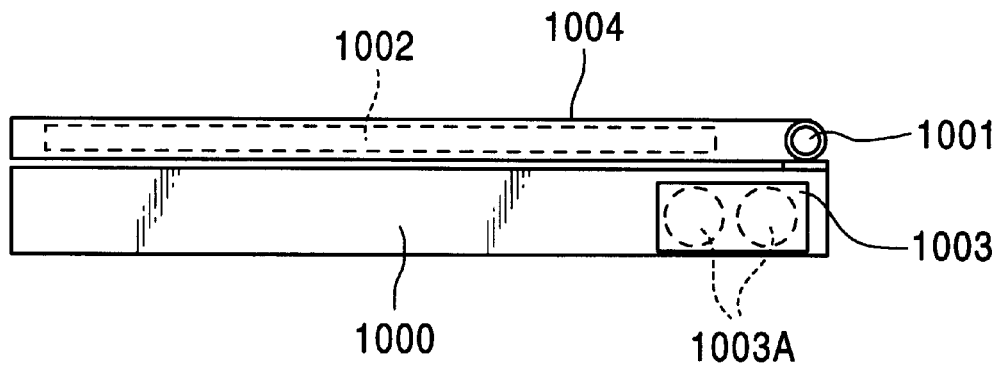
FIG. 19 illustrates the structure of a conventional portable computer.
Figure 20:
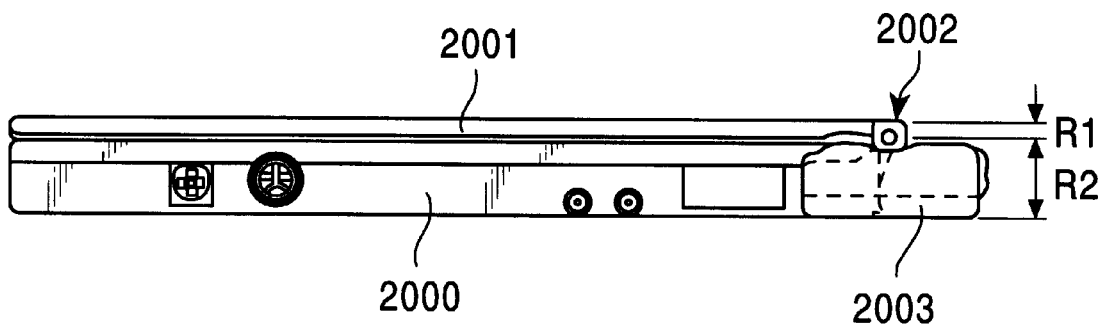
FIG. 20 illustrates the structure of a different conventional portable computer.

FIG. 17 is a perspective view showing a form of the strength retaining portion 11a of the fixed portion 11 and the heat-conducting portion 12. Rectangular holes 11c and 12c are formed in an upstanding portion 11b of the strength retaining portion 11a and the upstanding portion 12b of the heat-conducting portion 12, respectively.

A description will now be given of the movable portion 17. As shown in FIGS. 15 and 16, the movable portion 17 has a strength retaining portion 17a and a heat-conducting portion 13. The strength-retaining portion 17a is provided for retaining mechanical strength, whereas the heat-conducting portion 13 is provided for conducting heat. The strength retaining portion 17a is preferably made of a material with high mechanical strength, such as stainless steel (SUS) being an iron type material, in order to retain the strength thereof and the strength thereof when the display portion is being opened and closed.

The heat-conducting portion 13 is made of a material with good heat conductivity, such as copper or aluminum type material. The strength-retaining portion 17a, as well as the heat-conducting portion 13, is substantially L-shaped in cross section. A portion 13a of the heat-conducting portion 13 is brought into close contact with the strength-retaining portion 17a, whereas an upstanding portion 13b of the heat-conducting portion 13 is used so as to be separable from an upstanding portion 17b of the strength-retaining portion 17a.

FIG. 17 shows, three dimensionally, the strength-retaining portion 17a of the movable portion 17 and the heat-conducting portion 13. Circular holes 17c and 13c are formed in the upstanding portion 17b of the strength-retaining portion 17a and the upstanding portion 13b of the heat-conducting portion 13, respectively. It is to be noted that the diameter of the hole 17c is smaller than the diameter of the hole 13c.

A description will now be given of the engaging portion of FIGS. 15 and 16.

The engaging portion 30 is capable of mechanically joining the fixed portion 11 and the movable portion 17, while allowing heat conduction between the heat-conducting portion 12 of the fixed portion 11 and the heat-conducting portion 13 of the movable portion 17.

FIG. 17 shows the structural members of the engaging portion 30, which are a spring washer 14, a shaft 15, washers 16 and 18, a spring washer 19, and a stopper 20.

The shaft 15 is made of, for example, iron in order to, for example, retain mechanical strength, and has a projection 15a and a projection 15b, formed opposite to the projection 15a, both of which are provided with respect to a body 15c of the shaft 15. The projection 15a passes through a hole 14a in the spring washer 14, a hole 13c in the heat-conducting portion 13, the hole 12c in the heat-conducting portion 12, and the hole 11c in the strength-retaining portion 11a. The projection 15a has end surfaces 15e shaped to allow the projection 15a to be firmly fitted into the hole 12c in the heat-conducting portion 12 and the hole 11c in the strength-retaining portion 11a so that the heat-conducting portion 12 does not move. Accordingly, the projection 15a of the shaft 15 can be firmly fitted into the hole 12c in the heat-conducting portion 12a and the hole 11c in the strength-retaining portion 11a so that it does not move out of the holes 12c and 11c.

The spring washer 14 is used for holding down the heat-conducting portion 12 of the fixed portion 11 and the heat-conducting portion 13 of the movable portion 17 so that they are in close contact, and is made of a metal, such as iron.

The washer 16 is disposed between the shaft 15 and the strength-retaining portion 17a of the movable portion 17. The washer 16 has a hole 16c, which is rectangular in shape to allow insertion of the projection 15b of the shaft 15 therein. The projection 15b of the shaft 15 has planar end surfaces 15f and 15f. The projection 15b passes through the hole 17c in the strength-retaining portion 17a, a hole 18c in the washer 18, and a hole 19c in the spring washer 19, so that it can be firmly fitted into a hole 20c in the stopper 20. In other words, the projection 15b of the shaft 15 is firmly secured at the hole 20c in the stopper 20 so that it does get dislodged.

Accordingly, the fixed portion 11 and the movable portion 17 can be integrally coupled together by engaging the projection 15a of the shaft 15 and the hole 11c in the strength-retaining portion 11a and engaging the projection 15b of the shaft 15 and the hole 20c in the stopper 20. The shaft 15 allows rotation of the movable portion 17 with respect to the fixed-portion 11 in the R directions in FIG. 16.

The shaft 15, the washers 16 and 18, the spring washers 14 and 19, and the stopper 20 are made of, for example, an iron-type material with high mechanical strength. The heat-conducting portion 12 of the fixed portion 11 is positioned at the body 2 mounting surface side of the computer 100 of FIG. 1 (or the side contacting the body), and can be secured thereto with the screws 32, as shown in FIGS. 15 and 16. On the other hand, the heat-conducting portion 13a of the movable portion 17 is positioned at the display portion 3 mounting surface side of the computer 100 of FIG. 1 (or surface for mounting to display portion), and can be secured thereto with the screws 32.

As shown in FIGS. 15 and 16, when either the hinge 1A or the hinge 1B is in an assembled state, the upstanding portion 12b of the heat-conducting portion 12 of the fixed portion 11 and the upstanding portion 13b of the heat-conducting portion 13 of the movable portion 17 are in close contact with each other due to the pressing force of the spring washer 14, making it possible to make thermal resistance at the contact portion of the upstanding portions 12b and 13b of their respective heat-conducting portions 12 and 13 as small as possible.

Such hinges 1A and 1B are capable of retaining mechanical strength and conducting and dissipating heat, so that heat conduction between, for example, the body 2 of the computer 100 and the display portion 3 can be improved by allowing easy transfer of heat from a location where there is a larger amount of heat, such as the body 2, to a location where there is a smaller amount of heat, such as the display portion 3.

By improving heat conductivity, heat can be easily transferred from the body 2 where a larger amount of heat is generated to the display portion 3 where a smaller amount of heat is generated, thereby providing a location for heat dissipation, and allowing new heat-dissipating means such as a heat sink to be provided at the heat-conducting portion 12 and the heat-conducting portion 13, so that heat can be dissipated with greater efficiency.

For example, when the cases 2A and 3A of the body 2 and the display portion 3 of FIG. 14, respectively, are made of a light metal, such as magnesium, these cases 2A and 3A, themselves, can be used as heat sinks, which, when thermally connected to the heat-conducting portion 12 and the heat-conducting portion 13 of FIG. 14, can further increase the heat-dissipating effect.

It is a general rule that materials with good heat conductivity have low electrical resistance, so that the fixed portion 11 and the movable portion 17 of each of the hinges 1A and 1B can be coupled together with lower electrical resistance.

When, for example, the entire case 3A of FIG. 14 is made of a metal with good heat conductivity, the transferred heat can be dissipated externally of the entire case 3A. Here, it is preferable to use magnesium alloy for the case 3A. Magnesium materials, such as AZ91D, may be used for the magnesium alloy. The heat conductivity of the magnesium thereof is 157 W/mK. The thickness of the case 3A is, for example. 1.2 mm. The dimensions of the case 3A are, for example, 259 mm×208.6 mm×23.9 mm. Usable central process units include, for example, a Pentium processor 133 MHz, a trade name of an Intel product. The Pentium processor 133 MHz generates about 6 W of heat per unit time.

According to the above-described embodiment of the electronic device, in accordance with the present invention, which employs a folding-type structure using hinges in order to provide the heat sink with a surface area for allowing heat dissipation, heat transfer between different parts of the electronic device, such as the body of a portable computer (the side where the keyboard is provided) and the display portion, is improved by allowing heat to be transferred easily from a location where there is a larger amount of heat to a location where there is a smaller amount of heat. By improving heat conductivity, heat can be easily transferred from the body where a larger amount of heat is generated to the display portion where a smaller amount of heat is generated, thereby providing a place for heat dissipation, and allowing heat-dissipating means, such as heat sinks, to be provided, so that heat is dissipated with greater efficiency.

As can be understood from the foregoing description, the hinges 1A and 1B are provided at the back ends 2F and 3F of the body 2 and the display portion 3, and the battery pack 200 is disposed between the hinges 1A and 1B, so that the battery pack 200 is positioned outwardly of the body 2 and the display portion 3. Since the thickness obtained when the display portion 3 is folded upon the body 1 can be formed to about the diameter of the battery pack, the entire portable computer can be made thin. The battery pack 200 and the hinges 1A and 1B can be formed with the maximum diameter possible within the range the entire computer has been made thin, thereby making the hinges more durable and increasing the capacity of the battery pack 200.

The hinges 1A and !B, which are effective in conducting heat and have mechanical strength, are disposed between the body 2 and the display portion 3 serving as cover, and heat can be conducted between the cases of the hinges 1A and 1B, so that even when the portable computer is made thin, heat can be dissipated. Therefore, a thinner portable computer does not result in heat-related problems.

Since the battery pack 200 can be removably mounted to the body 2, the battery pack 200 is easy to replace. The battery pack 200 can ordinarily be charged from the body side at all times. Since the diameter of the hinges 1A and 1B can at least be the same as the diameter of the battery pack, a sufficient signal wire disposing space can be ensured for sending a signal from a circuit in the body 2 to the liquid crystal display portion 3, thereby allowing the use of a cheap, ordinary electrical wire for the signal wire.

Although the battery pack is substantially circular in cross section, the battery pack may take other forms. Although the first and second opening-and-closing mechanical portions took the form of hinges shown in the figures, they may take other forms.

The present invention is not limited to the above-described embodiment.

Although in the illustrated embodiment a portable personal computer was used as the electronic device to which the hinges of the present invention are applied, it is obvious that other types of electronic devices may also be used. The electronic device of the present invention may be used for various electronic devices which generate a large amount of heat, such as portable information terminals, portable telephones, or radio devices.

As can be understood from the foregoing description, according to the present invention, a pair of opening-and-closing portions are provided in order to openably and closably support the display portion with respect to the body, with a battery being disposed between the opening-and-closing portions.

This makes it possible to eliminate all of the factors preventing a reduction in the thickness of the electronic device resulting from the use of an externally mounting type battery, and to allow the display portion to open and close with respect to the body by more than 180 degrees.

In other words, in the aforementioned configuration, even when an externally mounting type battery is used, the electronic device can be made thin, and the opening-and-closing mechanical portions can be formed to approximately the outside dimensions of the battery, making it possible to increase the mechanical durability and strength of the opening-and-closing mechanical portions.

According to the above-described structure, the battery in no way interferes with the opening-and-closing operation of the display portion, so that the display portion can be opened by more than 180 degrees with respect to the body. In addition, even when the user accidentally opens the display portion by more than 180 degrees, damage to the body or the display portion does not occur.

According to the present invention directed to the body of the electronic device excluding the battery, there is provided at least a pair of opening-and-closing mechanical portions for openably and closably supporting a display portion with respect to a body, and a body side connecting mechanical portion, disposed between the pair of opening-and-closing mechanical portions, for removably mounting a battery which supplies electrical driving power to the body.

This allows the battery to take various forms and have various dimensions under the physical condition that it fits between the pair of opening-and-closing mechanical portions. Therefore, the external form of the battery is not limited by the form of the body, thereby allowing the external form of the battery itself to be designed with sufficient freedom.

According to the present invention directed to a battery, the battery, which is mounted to a body side connecting mechanical portion that is disposed between at least a pair of opening-and-closing mechanical portions that openably and closably support a display portion with respect to a body, comprises a battery side connecting mechanical portion which is removably fitted to the body side connecting mechanical portion.

This allows the external shape of the electronic device battery to be designed with sufficient freedom, independently of the form of the body. For example, the electronic device battery can be formed into a cylindrical shape. This eliminates the need for protrusions, making the electronic device battery easier to carry, and allowing it to be formed into an excellent form from the viewpoint of designing.

What is claimed is:

1. An electronic device, comprising:
   at least a pair of opening-and-closing mechanical portions for openably and closably supporting a display portion with respect to a body; and
   a battery, completely disposed between said pair of opening-and-closing mechanical portions, for supplying electrical driving power to the body.

2. An electronic device according to claim 1, wherein said pair of opening-and-closing mechanical portions support the display portion with respect to the body such that the display portion is openable and closable by more than 180 degrees.

3. An electronic device according to claim 1, further comprising a connecting mechanical portion for removably mounting said battery to the body.

4. An electronic device according to claim 1, wherein said pair of opening-and-closing mechanical portions comprise a first opening-and-closing mechanical portion, disposed between one side end of the body and one side end of the display portion, for openably and closably supporting the display portion with respect to the body; and a second opening-and-closing mechanical portion, disposed between the other side end of the body and the other side end of the display portion, for openably and closably supporting the display portion with respect to the body; wherein said battery is disposed between said first opening-and-closing mechanical portion and said second opening-and-closing mechanical portion.

5. An electronic device according to claim 1, wherein said pair of opening-and-closing mechanical portions both include cylindrical hinge mechanisms; and wherein said battery is cylindrical in shape which has substantially the same diameter as said hinge mechanisms, with the centers of rotation of said hinge mechanisms being disposed on a line extended from the axial line of said battery.

6. An electronic device according to claim 1, wherein either one or both of said opening-and-closing mechanical portions comprise hinge mechanisms constructed to conduct heat such that the heat that is generated in a body case is made to travel towards a display portion case, through said hinge mechanism or said hinge mechanisms.

7. An electronic device according to claim 1, wherein the display portion includes a liquid crystal display.

8. An electronic device according to claim 1, further comprising a guiding mechanical portion for guiding said battery in a direction of insertion and removal of said battery, when said battery is being mounted to and removed from the body.

9. An electronic device according to claim 1, further comprising a connecting mechanical portion for removably mounting said battery to the body, and for mechanically and electrically connecting said battery to the body; and a guiding mechanical portion for guiding said battery in a direction of insertion and removal of said battery, when said battery is being mounted to and removed from the body.

10. An electronic device according to claim 1, further comprising a securing mechanical portion for securing said battery mounted to the body.

11. An electronic device according to claim 3, wherein said connecting mechanical portion mechanically and electrically connects said battery to the body.

12. An electronic device according to claim 6, wherein the body case and the display portion case are both made of a material with high heat conductivity, with the heat, generated in the body case, being made to travel towards the display portion case, through said hinge mechanism or said hinge mechanisms.

13. An electronic device according to claim 8, wherein said guiding mechanical portion comprises a first guiding mechanical portion which is disposed between one end of said battery and said first opening-and-closing mechanical portion, and a second guiding mechanical portion which is disposed between the other end of said battery and said second opening-and-closing mechanical portion.

14. An electronic device according to claim 8, wherein said guiding mechanical portion comprises a combination of grooves and protrusions, said grooves being formed in both ends of said battery and said protrusions being formed on the surfaces of said opening-and-closing mechanical portions that oppose both ends of said battery, said protrusions being guided and sliding along the corresponding grooves.

15. An electronic device according to claim 8, wherein said guiding mechanical portion comprises a combination of grooves and protrusions, said grooves being formed in the surfaces of said opening-and-closing mechanical portions which oppose both ends of said battery, and said protrusions being formed on both ends of said battery, said protrusions being guided and sliding along the corresponding grooves.

16. An electronic device according to claim 10, wherein said securing mechanical portion comprises a mounting portion formed at said battery, and a recess for fitting therein said mounting portion.

17. An electronic device according to claim 10, wherein said securing mechanical portion is disposed in the vicinity of said connecting mechanical portion used for removably mounting said battery to the body.

18. An electronic device according to claim 10, wherein said securing mechanical portion and said connecting mechanical portion for removably mounting said battery are disposed in a row at the contact surfaces of the body and said battery.

19. An electronic device according to claim 11, wherein said connecting mechanical portion includes electrical connecting terminals, said electrical terminals being disposed at said battery and the body, said electrical connecting terminal at said battery being electrically connected to said electrically connecting terminal at the body as a result of bringing said electrically connecting terminal at said battery into contact with said electrically connecting terminal at the body.

20. An electronic device, comprising:
   at least a pair of opening-and-closing mechanical portions for openably and closably supporting a display portion with respect to a body; and
   a body side connecting mechanical portion, completely disposed between said pair of opening-and-closing mechanical portions, for removably mounting a battery supplying electrical driving power to the body.

21. An electronic device according to claim 20, wherein said pair of opening-and-closing mechanical portions support the display portion with respect to the body so that the display portion is openable and closable by more than 180 degrees while said battery is mounted to the body.

22. An electronic device battery mounted to a body side connecting mechanical portion that is completely disposed between at least a pair of opening-and-closing mechanical portions that openably and closably support a display portion with respect to a body, said electronic device battery comprising a battery side connecting mechanical portion which is removably fitted to said body side connecting mechanical portion.

23. An electronic device battery according to claim 22, wherein said electronic device battery is formed into a cylindrical shape with substantially the same diameter as cylindrical hinge mechanisms making up the pair of opening and-closing mechanical portions, and is mounted to the body such that the rotational center of the hinge mechanisms lies on a line extended from the axial line of the cylindrical shape of said electronic device battery.

24. An electronic device battery according to claim 22, further comprising a battery side guiding mechanical portion for guiding said electronic device battery in a direction of insertion and removal thereof, when said electronic device battery is being mounted to and removed from the body.

25. An electronic device battery according to claim 22, further comprising a battery side securing mechanical portion for securing said electronic device battery being mounted to the body.

26. An electronic device, comprising,
   at least a pair of opening-and-closing mechanical portions for openably and closably supporting a display portion with respect to a body;
   a battery, disposed between said pair of opening-and-closing mechanical portions, for supplying electrical driving power to the body; and
   wherein said pair of opening-and-closing mechanical portions both include cylindrical hinge mechanisms; and wherein said battery is cylindrical in shape and has substantially the same diameter as the hinge mechanism, with the centers of rotation of said hinge mechanisms being disposed on a line extended from the axial line of said battery.

27. An electronic device battery mounted to a body side connecting mechanical portion that is disposed between at least a pair of opening-and-closing mechanical portions that openably and closably support a display portion with respect to a body, said electronic device battery comprising a battery side connecting mechanical portion which is removably fitted to said body side connecting mechanical portion; wherein said electronic device battery is formed into a cylindrical shape with substantially the same diameter as cylindrical hinge mechanisms making up the pair of opening-and-closing mechanical portions, and is mounted to the body such that the rotational center of the hinge mechanisms lies on a line extended from the axial line of the cylindrical shape of said electronic device battery.

28. An electronic device, comprising:
   at least a pair of opening-and-closing mechanical portions for openably and closably supporting a display portion with respect to a body;
   a battery, disposed between said pair of opening-and-closing mechanical portions, for supplying electrical driving power to the body; and a guiding mechanical portion for guiding said battery in a direction of insertion and removal of said battery, when said battery is being mounted and removed from the body.

29. An electronic device according to claim 28, wherein said guiding mechanical portion comprises a first guiding mechanical portion which is disposed between one end of said battery and said first opening-and-closing mechanical portion, and a second guiding mechanical portion which is disposed between the other end of said battery and said second opening-and-closing mechanical portion.

30. An electronic device according to claim 28, wherein said guiding mechanical portion comprises a combination of grooves and protrusions, said grooves being formed in both ends of said battery and said protrusions being formed on the surfaces of said opening-and-closing mechanical portions that opposed both ends of said battery, said protrusions being guided and sliding along the corresponding grooves.

31. An electronic device according to claim 28, wherein said guiding mechanical portion comprises a combination of grooves and protrusions, said grooves being formed in the surfaces of said opening-and-closing mechanical portions which oppose both ends of said battery, and said protrusions being formed on both ends of said battery, said protrusions being guided and sliding along the corresponding grooves.

32. An electronic device, comprising:
   at least a pair of opening-and-closing mechanical portions for openably and closably supporting a display portion with respect to a body;
   a battery, disposed between said pair of opening-and-closing mechanical portions, for supplying electrical driving power to the body; and
   a connecting mechanical portion for removably mounting said battery to the body, and for mechanically and electrically connecting said battery to the body; and a guiding mechanical portion for guiding said battery in a direction of insertion and removal of said battery, when said battery is being mounted to and removed from the body.

33. An electronic device, comprising:
   at least a pair of opening-and-closing mechanical portions for openably and closably supporting a display portion with respect to a body;
   a battery, disposed between said pair of opening-and-closing mechanical portions, for supplying electrical driving power to the body; and
   a securing mechanical portion for securing said battery mounted to the body wherein said securing mechanical portion and said connecting mechanical portion for removably mounting said battery are disposed in a row at the contact surfaces of the body and said battery.

34. An electronic device battery mounted to a body side connecting mechanical portion that is disposed between at least a pair of opening-and-closing mechanical portions that openably and closably support a display portion with respect to a body, said electronic device battery comprising a battery side connecting mechanical portion which is removably fitted to said body side connecting mechanical portion and a battery side guiding mechanical portion for guiding said electronic device battery in a direction of insertion and removal thereof, when said electronic device battery is being mounted to and removed from the body.

* * * * *